United States Patent [19]
Merritt et al.

[11] Patent Number: 5,803,026
[45] Date of Patent: Sep. 8, 1998

[54] INTERNAL COMBUSTION ENGINE

[75] Inventors: Dan Merritt, 139 Bagington Road, Stychevale, Coventry, CV3 6FY; Clifford Williams, Brixworth, both of Great Britain

[73] Assignee: Dan Merritt, Stychevale, Great Britain

[21] Appl. No.: 816,507

[22] Filed: Mar. 13, 1997

[30] Foreign Application Priority Data

Mar. 16, 1996 [GB] United Kingdom .................... 9605557

[51] Int. Cl.$^6$ .................................................. F02B 75/04
[52] U.S. Cl. .................... 123/48 R; 123/48 D; 123/78 R
[58] Field of Search ................................ 123/48 R, 48 A, 123/48 D, 78 R, 267

[56] References Cited

U.S. PATENT DOCUMENTS

| 3,741,175 | 6/1973 | Rouger | 123/48 A |
|---|---|---|---|
| 4,168,678 | 9/1979 | Nohira et al. | 123/48 D |
| 4,202,300 | 5/1980 | Skay | 123/48 D |
| 4,651,703 | 3/1987 | Hoppie | 123/48 D |
| 4,890,585 | 1/1990 | Hathorn | 123/48 A |

FOREIGN PATENT DOCUMENTS 2279407 1/1995 United Kingdom .

*Primary Examiner*—Thomas N. Moulis
*Attorney, Agent, or Firm*—Flanagan & Flanagan; John R. Flanagan; John K. Flanagan

[57] ABSTRACT

An internal combustion engine has at least one pair of first and second cylinders (12, 14) with the first (12) cylinder having a larger swept volume than the second cylinder (14) and respective first and second pistons (16, 18) reciprocable in the cylinders. The second piston (18) has a drive stem (234) and divides the second cylinder into a first volume (15*a*) containing the drive stem of the second piston and a second volume (15*b*) between the two pistons. The first cylinder (12) has an air inlet (25) and an exhaust outlet (12). A common combustion space (20) is formed between the pistons when the pistons are substantially at their inner dead center positions, the combustion space comprising the second volume (15*b*). The engine also has transfer means (38) enabling gas flow between the first and second volumes (15*a*, 15*b*) towards the end of the compression stroke of the second piston (18)., and inhibiting means for inhibiting movement of fuel/air mixture from the first volume into the second volume until towards the end of the compression stroke of the second piston. A fuel injector (34) provides fuel to the first volume (15*a*). The second piston has a drive means (500). A cavity (520) is formed in a side wall (14*a*) of the second cylinder and opens into the second cylinder through an aperture (525), the aperture being axially spaced from the inner dead center position of the second piston (18). A spark plug (52) is located in the cavity means. The arrangement helps to prevent sooting of the spark plug.

7 Claims, 4 Drawing Sheets

5,803,026

INTERNAL COMBUSTION ENGINE

FIELD OF THE INVENTION

The present invention relates to an internal combustion engine.

DESCRIPTION OF THE PRIOR ART

A "segregating engine" is an engine where the bulk of the fuel does not begin to mix with the bulk of the air inducted by the engine until near the end of the compression stroke, just before ignition, and various internal combustion engines which can be classified as segregating engines are known, for example from GB-A-2155546, GB-A-2186913, GB-A-2218153, GB-A-2238830, GB-A-2246394, GB-A-2261028, GB-A-2268544 and GB-A-2279407. Those engines are now known in the literature as the Merritt engines.

The diesel engine is also a segregating engine whereas the spark ignition gasoline engine (SIGE) compresses a pre-mixed mixture of fuel and air.

An important characteristic of segregating engines such as the diesel and Merritt engines is the confinement of the fuel, away from most of the air, until just before the moment of ignition, and the rapid delivery of the fuel into the combustion chamber near the end of the compression stroke.

The Merritt engines use what is referred to as the Merritt combustion management system (MCC) which represents a sequence of processes designed to promote combustion in a reciprocating combustion engine. In this respect it is similar to the other generic combustion management systems, such as diesel and Otto, or SIGE. MCC can be operated by a number of devices which are described in the earlier patent specifications mentioned above. MCC is characterised by the segregation of at least part of the fuel supplied to the engine in a second, smaller cylinder having a smaller piston and containing some air, with or without exhaust gas, and the introduction of the fuel into the smaller cylinder during the exhaust and/or induction and/or compression strokes of the larger piston. The fuel remains segregated from the bulk of the main air charge which may contain some fuel air until ingression occurs, near the end of the compression strokes of both pistons. This arrangement allows the fuel appreciable time to vaporise in some air (which may include products of combustion of the previous cycle) before combustion starts, in contrast with the diesel segregating engine where liquid fuel is first injected into the air just before the moment of ignition. In the MCC system the smaller cylinder is used as a vaporising cylinder and the smaller piston is used as a fuel transfer piston. Hence the smaller cylinder can be referred to as the fuel management cylinder. The larger cylinder receives the air, unthrottled and without fuel, and the larger piston is used to compress the air.

A problem which can occur in a Merritt Engine under certain operational conditions is carbon sooting of a spark plug. When a spark plug ignites a rich hydrocarbon fuel/air mixture, which, in the vicinity of the spark plug, contains more fuel than the amount of oxygen available fully to burn it, the spark plug is prone to be covered with a deposit of fine carbon particles known as soot. This takes place because the hydrogen in the fuel combines with the oxygen in the air more readily than the carbon, leaving some carbon unburnt. Since carbon is an electrical conductor the electrical current transmitted through the spark plug is diverted from the spark gap to the carbon film and the spark fails.

BRIEF SUMMARY OF THE INVENTION

The present invention seeks to provide an improved internal combustion engine.

Accordingly, the present invention provides an internal combustion engine comprising:

at least one pair of first and second cylinders said first cylinder having a larger swept volume than said second cylinder;

respective first and second pistons reciprocable in said cylinders, wherein said second piston has a drive stem and divides said second cylinder into a first volume containing said drive stem of said second piston and a second volume between said two pistons;

air inlet means communicating with said first cylinder;

exhaust means communicating with said first cylinder;

means defining a common combustion space between said pistons when said pistons are substantially at their inner dead centre positions, said combustion space comprising said second volume;

transfer means for enabling gas flow between said first and second volumes towards the end of the compression stroke of said second piston;

inhibiting means for inhibiting movement of fuel/air mixture from said first volume into said second volume until towards the end of the compression stroke of said second piston;

a first fuel source for providing fuel to said first volume;

drive means for driving said second piston;

cavity means formed in a side wall of said second cylinder and opening into said second cylinder through aperture means, said aperture means being axially spaced from the inner dead center position of said second piston;

and spark ignition means in said cavity means.

During the compression stroke of the engine, the arrangement enables the cavity means to be charged firstly with vaporised fuel delivered from the second cylinder and subsequently with air or lean air/fuel mixture delivered from the first cylinder..

Preferably the drive means includes means for maintaining said second piston substantially stationary at or adjacent its inner dead center position during at least a portion of the expansion stroke of said first piston.

BRIEF DESCRIPTION OF THE DRAWINGS

The present invention is further described hereinafter, by way of example, with reference to the accompanying drawings, in which.

DETAILED DESCRIPTION

Figure 1:
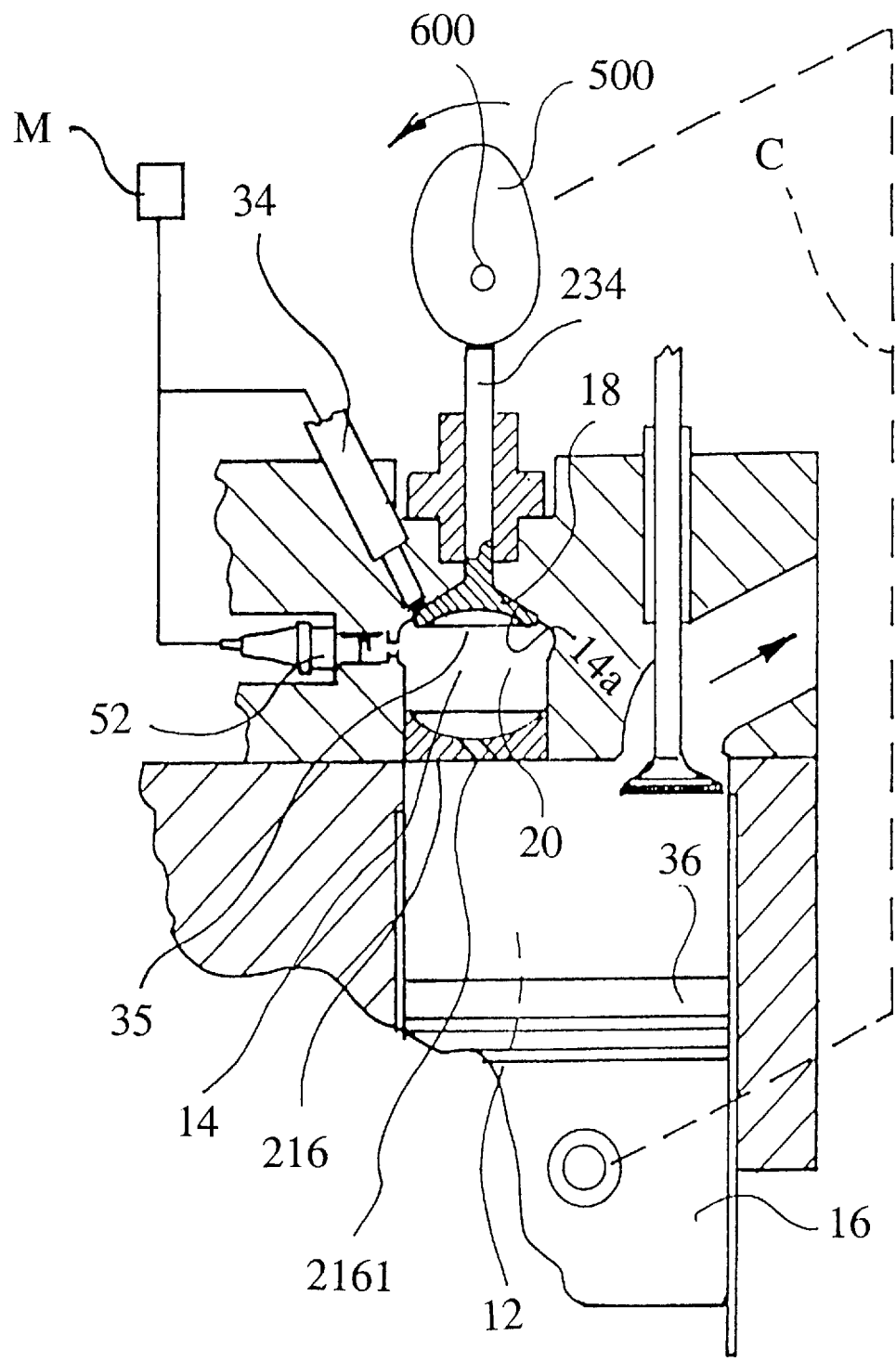
FIG. 1 is a partial section through a portion of a preferred form of engine according to the present invention.

The invention described herein is an improvement on the engine disclosed in U.S. Pat. No. 5,560,326 the contents of which are incorporated here by reference. The reader is directed to this earlier specification for a full description of the engine and its methods of operation.

The Merritt engine shown in the drawings has a larger cylinder 12 and a smaller cylinder 14 which is an extension of the larger cylinder. A smaller piston 18 is movable in the smaller cylinder 14 and has a crown 35 and a cylindrical drive stem 234. A larger piston 16 is movable in the larger cylinder 12, has a crown 36 and is sealed with the aid of piston rings in the conventional way. The two pistons are moved by separate mechanisms which may be geared or coupled together or are controlled to operate together by a suitable mechanism C. For example, the larger piston 16 may be moved by a crankshaft and connecting rod arrangement and the smaller piston 18 by a cam 500 attached to a camshaft 600. The stroke distance of the two pistons may be different. Preferably the larger piston has a longer stroke.

Figure 2:
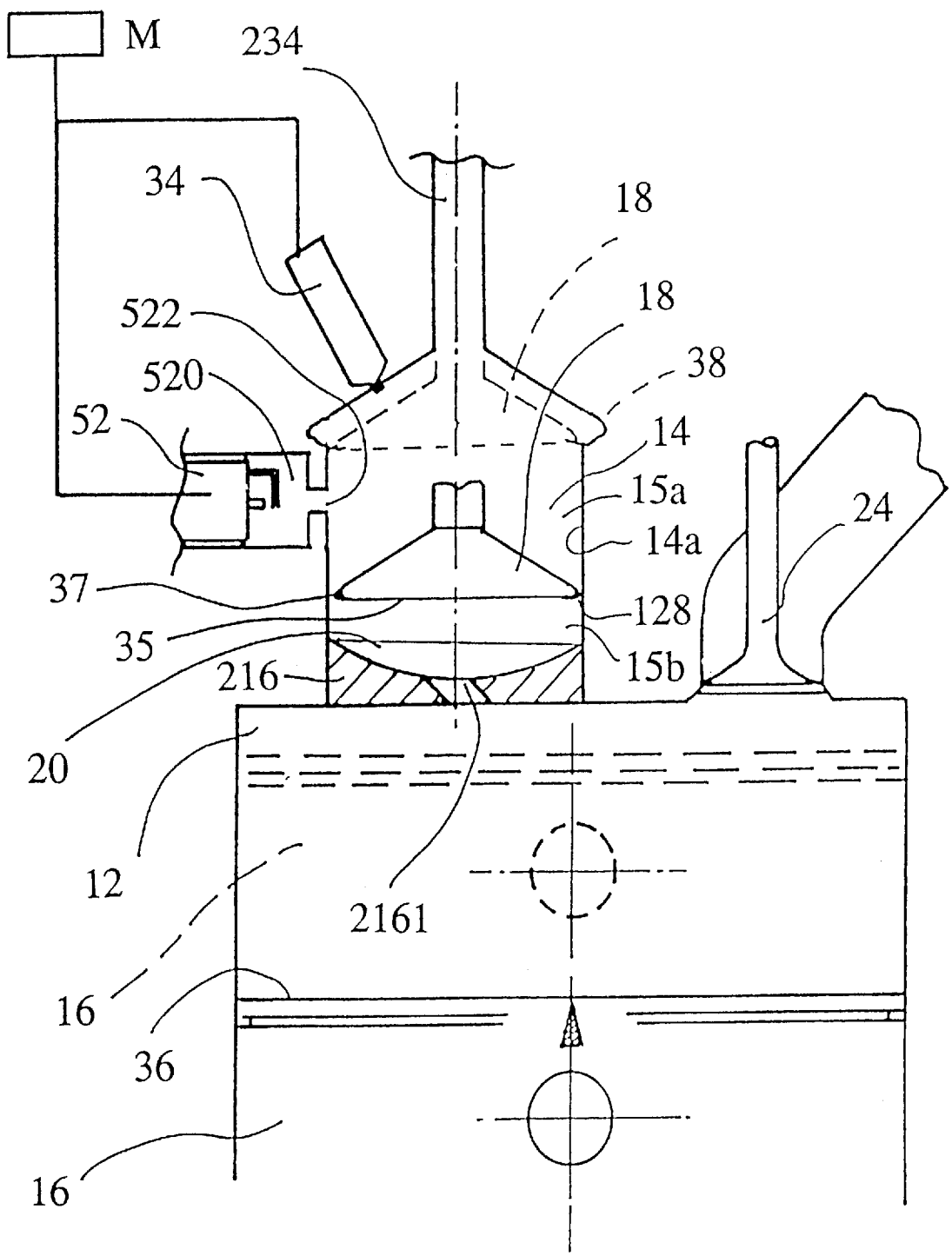
FIG. 2 is an enlarged diagrammatic view of a portion of FIG. 1 at one point in the engine cycle.

As is clear from FIG. 2, the smaller piston 18 divides the second cylinder 14 into a first volume 15a behind the crown 35 of the smaller piston, containing the drive stem 234, and a second volume 15b situated between the two pistons. It will be appreciated that these volumes vary with the movement of the piston 18. The crown 35 of the smaller piston 18 has an edge 37 with an axial thickness which is substantially less than the stroke of the piston 18. The crown 35 is shown to have a cylindrical peripheral edge 37 which is spaced slightly away from the wall 14a of the smaller cylinder to form an annular gap 128.

Fuel is delivered into the smaller cylinder 14 by a fuel injector 34. A spark plug 52 is provided in a cavity 520 for ignition. The fuel injector and spark plug can be controlled by an engine management system M.

A combustion space 20 is formed between the two pistons 16,18 and is partially separated from the larger cylinder 12 by a restriction or plate 216 which has an aperture 2161. The aperture allows the movement of gases between the combustion space 20 and the larger cylinder 12 and serves a number of functions. It promotes swirl motion in the air moving from the larger cylinder 12 to the combustion space 20 during the compression stroke of the larger piston 16. It also promotes an outflow of hot gases from the combustion space 20 in a form of a jet during the early stages of combustion.

Figure 3:
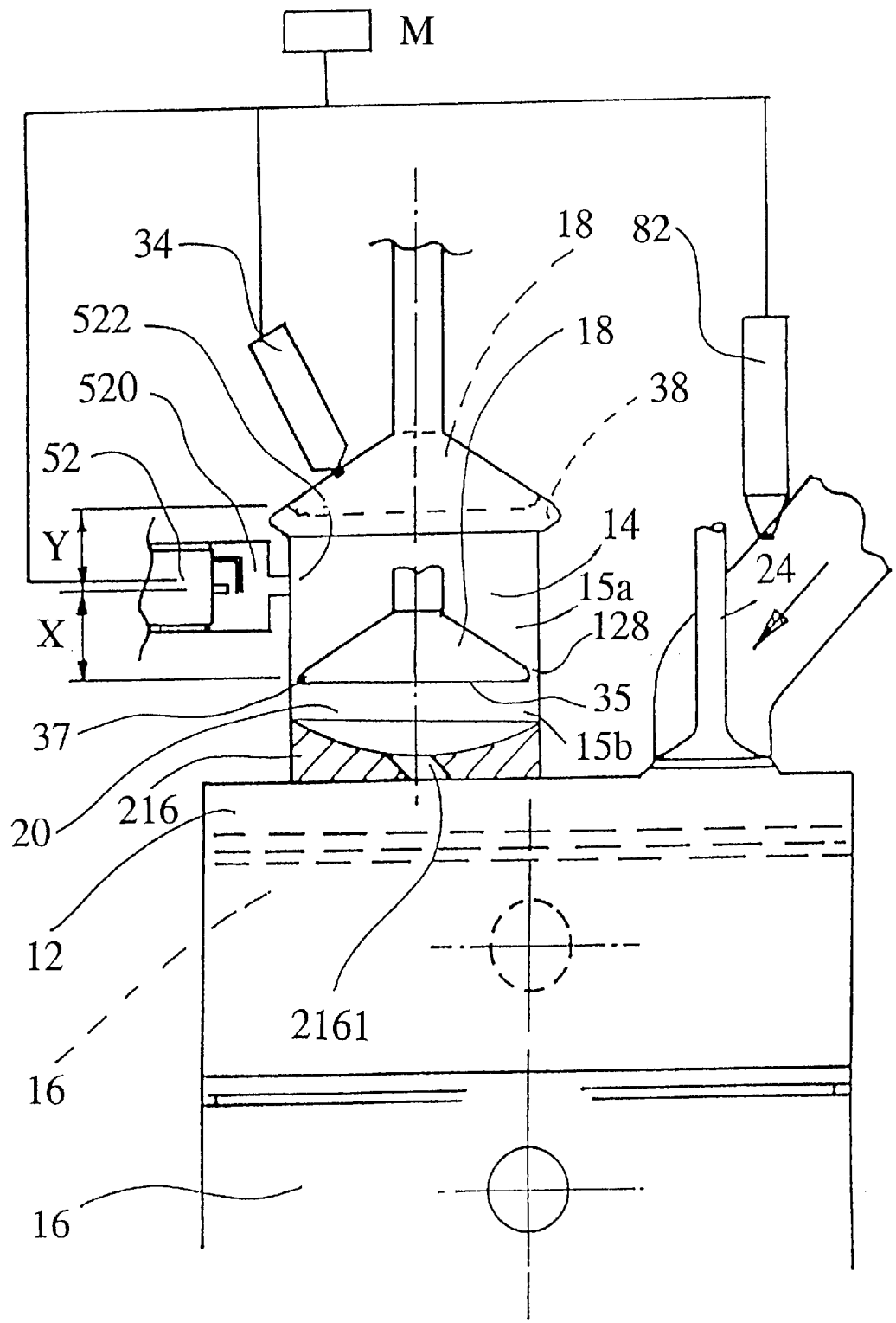
FIG. 3 is a view similar to that of FIG. 2.

FIG. 2 shows the spark plug 52 located inside the cavity 520 which communicates with the combustion chamber 20 through a restricting hole or aperture 522. More than one aperture may be used. The aperture 522 is conveniently circular and coaxial with the axis of the cavity 520 although it will be appreciated that any suitable shape or position may be used. The smaller piston 18 is shown in FIG. 3 in solid lines at its outer dead centre position with the edge 37 of the crown 35 being spaced a distance X below the centre of the aperture 522. The piston 18 is also shown in broken lines at its inner dead centre or parked position with the edge 37 a distance Y above the centre of the aperture 522.

The principle of operation of the invention is as follows;

When the second piston 18 moves from its parked position (inner dead centre position) to its outer dead centre position to effect an induction stroke, fuel is injected into the first volume 15a of the smaller cylinder 14 through fuel injector 34. During this induction period the larger piston 16 moves through both an exhaust stroke and an induction stroke.

During the induction stroke of the smaller piston 18 either the exhaust valve or the inlet valve of the engine is open into the larger cylinder 12 so that the pressure in the second cylinder 14 is at or near atmospheric pressure. At the end of the induction stroke and the beginning of the compression stroke of the larger piston 16 the pressure inside the spark plug cavity 520 is also at or near atmospheric pressure. However, once the pistons 16 and 18 start their compression strokes substantially together, the pressure in the spark plug cavity 500 begins to rise following the pressure rise in the smaller cylinder 14.

During the first part of the compression stroke of the smaller piston 18 (FIG. 3), whilst distance X is greater than zero, the gas contents of volume 15 a of the smaller cylinder 14 (comprising vaporised fuel mixed with some air and some products of combustion) is subjected to an increased pressure and some is forced into the ignition cavity 520 through aperture 522, charging the cavity with gas. The pressure of the air in the combustion space 20 also rises as a result of compression above the crown of the larger piston 16. As the edge 37 of the smaller piston 18 crosses the aperture 522 and moves along distance Y of its stroke, air from the combustion space 20 begins to enter the cavity 520 through the aperture 522 to mix with fuel already in the cavity.

The engine uses the edge 37 of the crown 35 of the second piston 18 to apportion vaporised fuel and air into the ignition cavity, a feature which is not available to other more conventional engines.

The correct positioning of the aperture 522 in terms of the distances X and Y enables the air/fuel mixture range within the cavity 520 to be controlled and ignited by a spark without excessive production of soot.

The amount of fuel vaporised in the fuel/air mixture contained in the smaller cylinder 14 depends on the overall air/fuel ratio selected for the engine as a whole. Hence the amount of fuel entering the ignition cavity 520 increases with increasing fuel supply to the engine.

It will be appreciated that since ignition without excessive soot formation is possible over a range of air/fuel ratios within the flammability limit, the position of the aperture 522 can be chosen to enable the engine to operate over a substantial air/fuel ratio range.

One advantage of the above-described arrangement is that the jet of gases which enter cavity 520 from the volume 15a and the combustion space 20 during the charging period assists in cleaning any soot previously deposited on the spark plug. Another advantage is that the fuel forced into the ignition cavity 520 is already vaporised and there is therefore no risk of any liquid fuel being deposited on the spark plug.

The invention allows a number of ways of extending the overall operational air/fuel range of the engine, as follows.

1. The engine may be used in a hybrid mode as shown in FIG. 3, where some of the fuel may be delivered by injector 82 and enter the engine through the inlet valve 24 when the engine requires high fuelling conditions. For a given position of the ignition aperture 522, less fuel enters the cavity 520 during the fuel charging phase. The effect of a very small amount of fuel in the induction air on the air/fuel ratio in the cavity is much smaller. The addition of fuel to the engine through an injector 82 causes a lowering of the amount of fuel in the cavity 520 under high fuelling conditions. When the volume of the second cylinder 14 is designed to accept only fuel necessary for idling and low load, whilst most of the fuel is delivered through injector 82, the fuel/air ratio in cavity 520 may be kept within a narrow range.

Figure 4:
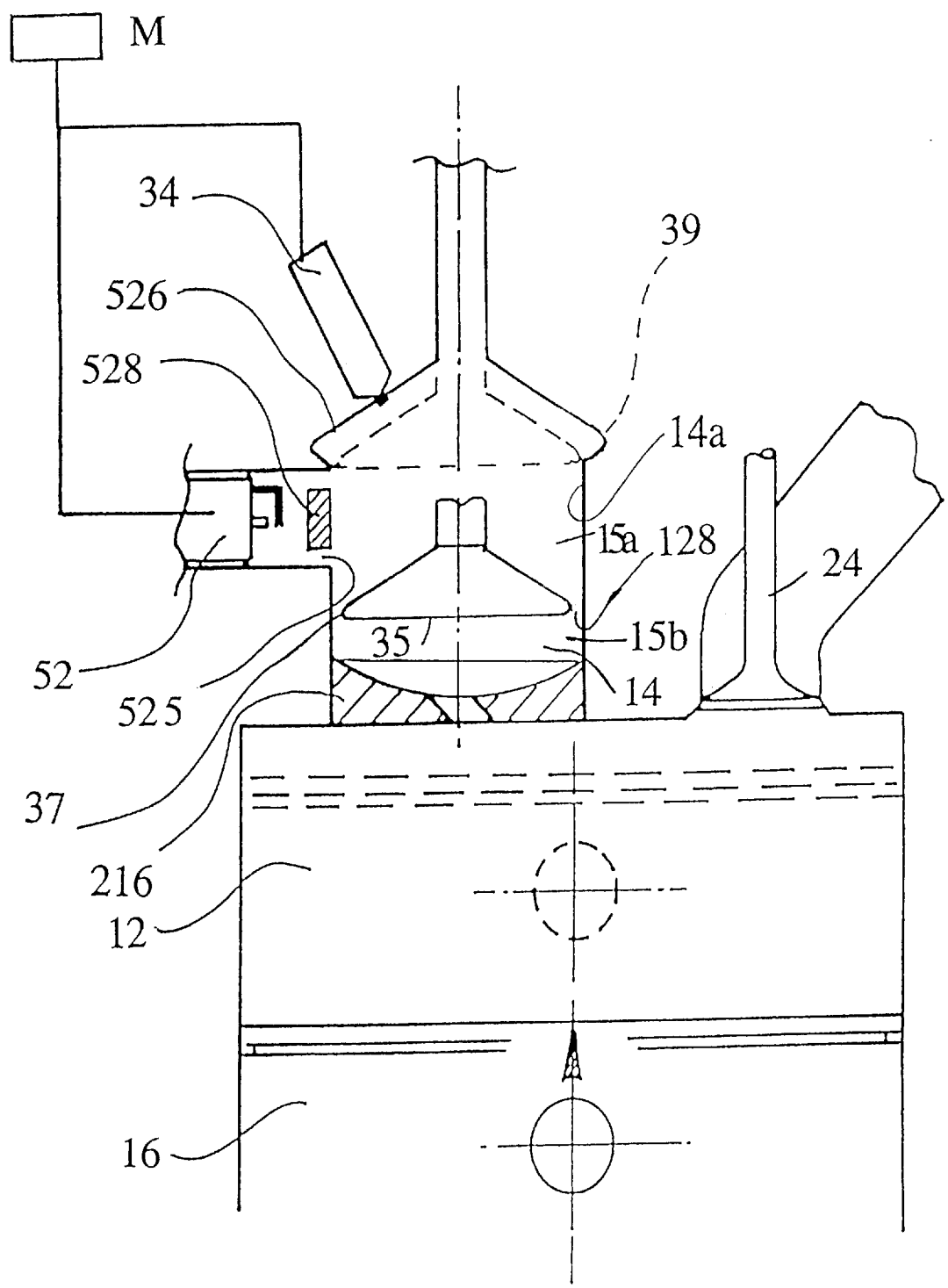
FIG. 4 is a view similar to that of FIG. 2, sharing a modified form of engine according to the present invention.

2. The ignition cavity 520 may be provided with two or more apertures 525, 526 as shown in FIG. 4. This creates a dynamic effect of air flowing through the cavity between the apertures 525, 526 during the charging process, which can extend the engine's air/fuel ratio catered for by the cavity and also assist in the cleaning of any soot previously deposited on the spark plug.

3. The apertures 525, 526 may be provided in a rotatable disc type plug 528 located in the wall 14A of the second cylinder 14. Given an external adjustment of the position of the disc plug the effective air fuel ratio inside the ignition cavity can be altered by the engine management system.

4. The second cylinder 14 can be provided with two or more separate ignition cavities at different axial locations so that, between them, they cover the full range of air/fuel ratios needed by the engine. The two cavities need not have the same volume and the two associated spark plugs need not be energised together. During operation, the upper ignition cavity will be charged with a richer air/fuel mixture than the lower cavity making it more suitable for use when the engine is operated at lower BMEP with an overall leaner air fuel mixture. The lower cavity will be charged with a leaner air fuel mixture compared with the upper cavity making it more suitable for the engine operating under high BMEP conditions with overall richer air fuel mixtures.

When the engine operates at low BMEP the upper spark plug is used and the lower one is not. The fuel contents of the lower cavity, if unburnt, emerge into the combustion chamber during the exhaust stroke.

When the engine operates a high BMEP the lower spark plug is energised and the upper one is not.

5. The radial gap 128 between the crown 35 of the second piston 18 and the cylinder wall 14a may vary along the periphery of the piston. Since this gap 128 permits air to flow from the second volume 15b to the first volume 15a during the compression stroke of the first piston 16, the gap affects the air/fuel ratio in the ignition cavity 520. Control over the air/fuel ratio can be achieved by rotating the second piston 18 about its longitudinal axis.

6. The axial thickness of the crown 35 of the second piston 18 may vary along its periphery. Since this thickness affects the time of exposure of the aperture 522 of the ignition cavity 520 to the flow of gas into the cavity, control over the air/fuel ratio can be achieved by rotating the second piston 18 about its longitudinal axis.

7. The ignition cavity 520 may have an externally actuated needle valve which can block progressively the aperture or apertures 522 to provide control over the air/fuel ratio in the cavity 520.

We claim:

1. An internal combustion engine comprising:

at least one pair of first and second cylinders said first cylinder having a larger swept volume than said second cylinder;

respective first and second pistons reciprocable in said cylinders, wherein said second piston has a drive stem and divides said second cylinder into a first volume containing said drive stem of said second piston and a second volume between said two pistons;

air inlet means communicating with said first cylinder;

exhaust means communicating with said first cylinder;

means defining a common combustion space between said pistons when said pistons are substantially at their inner dead centre positions, said combustion space comprising said second volume;

transfer means for enabling gas flow between said first and second volumes towards the end of the compression stroke of said second piston;

inhibiting means for inhibiting movement of fuel/air mixture from said first volume into said second volume until towards the end of the compression stroke of said second piston;

a first fuel source for providing fuel to said first volume;

drive means for driving said second piston;

cavity means formed in a side wall of said second cylinder and opening into said second cylinder through aperture means, said aperture means being axially spaced from the inner dead centre position of said second piston; and spark ignition means in said cavity means.

2. An internal combustion engine as claimed in claim 1 comprising at least two said cavity means in said side wall, each of which has a respective aperture means axially spaced apart from each other and respective spark ignition means in each cavity means.

3. An internal combustion engine as claimed in claim 1 wherein the aperture means comprises at least two apertures axially spaced apart or an elongate slot or slots.

4. An internal combustion engine as claimed in claim 2 wherein the aperture means comprises at least two apertures axially spaced apart or an elongate slot or slots.

5. An internal combustion engine as claimed in claim 2 wherein each said spark ignition means is energisable independently of the others.

6. An internal combustion engine as claimed in claim 1 having a second fuel source means for providing fuel to said first cylinder.

7. An internal combustion engine as claimed in claim 1 having a throttle valve in said air inlet means and a second fuel source means for providing fuel to said first cylinder.

* * * * *